US010220667B2

(12) United States Patent
Peard et al.

(10) Patent No.: US 10,220,667 B2
(45) Date of Patent: Mar. 5, 2019

(54) DEDICATED FLOOR BLEED FOR AN AIR CONDITIONING SYSTEM

(71) Applicants: Denso International America, Inc., Southfield, MI (US); DENSO CORPORATION, Kariya (JP)

(72) Inventors: Tom Peard, Birmingham, MI (US); Gregory Thompson, Ortonville, MI (US); Raymond Bailey, South Lyon, MI (US); Melissa Buczek, Orion, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 591 days.

(21) Appl. No.: 14/010,647

(22) Filed: Aug. 27, 2013

(65) Prior Publication Data
US 2014/0060776 A1 Mar. 6, 2014

Related U.S. Application Data

(60) Provisional application No. 61/694,974, filed on Aug. 30, 2012.

(51) Int. Cl.
*B60H 1/00* (2006.01)
(52) U.S. Cl.
CPC .............. *B60H 1/00021* (2013.01)
(58) Field of Classification Search
CPC ............ B60H 1/00021; B60H 1/00028; B60H 1/00842; B60H 2001/00099;
(Continued)

(56) References Cited

U.S. PATENT DOCUMENTS 5,042,566 A * 8/1991 Hildebrand ........ B60H 1/00064
165/204
5,325,912 A * 7/1994 Hotta ................. B60H 1/00392
165/204

(Continued)

FOREIGN PATENT DOCUMENTS

CN 101508235 A 8/2009
JP 10-236137 9/1998
(Continued)

OTHER PUBLICATIONS

Search Report and Written Opinion dated Nov. 6, 2013 in corresponding PCT Application No. PCT/US2013/057195 (11 pages).
(Continued)

*Primary Examiner* — Frantz Jules
*Assistant Examiner* — Nelson Nieves
(74) *Attorney, Agent, or Firm* — Harness, Dickey & Pierce, P.L.C.

(57) ABSTRACT

A heating, ventilation and air conditioning system includes a case having a face outlet and a foot outlet. A door is movable between a first position closing the face outlet and opening the foot outlet and a second position opening the face outlet and closing the foot outlet. A bypass passage allows air flow around the door when the door is in the second position to allow a specified amount of air flow to the foot outlet when the door closes the foot outlet.

11 Claims, 4 Drawing Sheets

(58) Field of Classification Search
CPC .... B60H 2001/00214; B60H 2001/002; B60H 2001/00092
USPC .................................................. 165/203, 204
See application file for complete search history.

(56) References Cited

U.S. PATENT DOCUMENTS

| | | | | |
|---|---|---|---|---|
| 6,012,295 | A * | 1/2000 | Isobe | B60H 1/00735 165/204 |
| 6,148,904 | A | 11/2000 | Tsunooka et al. | |
| 6,293,339 | B1 | 9/2001 | Uemura et al. | |
| 6,354,169 | B1 * | 3/2002 | Toyoshima et al. | 74/490.15 |
| 7,503,383 | B2 | 3/2009 | Yamaguchi et al. | |
| 7,766,078 | B2 * | 8/2010 | Kim | B60H 1/00685 165/203 |
| 8,141,622 | B2 * | 3/2012 | Kang | B60H 1/00007 165/203 |
| 2002/0129931 | A1 | 9/2002 | Nagata et al. | |
| 2004/0069483 | A1 * | 4/2004 | Natsume et al. | 165/204 |
| 2005/0126774 | A1 * | 6/2005 | Yamaguchi | B60H 1/00021 165/204 |
| 2006/0208100 | A1 | 9/2006 | Ellison et al. | |
| 2007/0181295 | A1 * | 8/2007 | Masatsugu | 165/202 |
| 2007/0204985 | A1 * | 9/2007 | Fukagawa et al. | 165/203 |
| 2009/0209194 | A1 | 8/2009 | Hurd et al. | |

FOREIGN PATENT DOCUMENTS

| | | |
|---|---|---|
| JP | 11-11135 | 1/1999 |
| JP | 2009-214869 | 9/2009 |
| KR | 10-2006-0104122 | 10/2006 |

OTHER PUBLICATIONS

JP Office Action dated Dec. 22, 2015 in corresponding JP Application No. 2015-514249 (English Translation).

* cited by examiner

DEDICATED FLOOR BLEED FOR AN AIR CONDITIONING SYSTEM

CROSS-REFERENCE TO RELATED APPLICATIONS

This application claims the benefit of U.S. Provisional Application No. 61/694,974, filed on Aug. 30, 2012. The entire disclosure of the above application is incorporated herein by reference.

FIELD

The present disclosure relates to a vehicle Heating, Ventilation and Air Conditioning (HVAC) system. More particularly, the present disclosure relates to a dedicated floor bleed which directs air toward the floor outlet when the HVAC system is in the face or panel mode.

BACKGROUND

This section provides background information related to the present disclosure which is not necessarily prior art.

Vehicles are known to incorporate HVAC systems to improve the comfort of the people within the passenger compartment of the vehicle. The HVAC systems heat and cool air blown through the HVAC system using a heating heat exchanger and/or a cooling heat exchanger. The heating heat exchanger typically utilizes the engine coolant as a source of heat for heating the air. The cooling heat exchanger is typically an evaporator which is part of an air conditioning system in the vehicle powered by the engine of the vehicle. The air blown through the HVAC system comes from air outside the vehicle, air inside the passenger compartment of the vehicle or a combination of the air outside the vehicle and the air inside the passenger compartment of the vehicle. The air being blown through the HVAC system is conditioned (heated/cooled) and is then directed into the passenger compartment of the vehicle through one or more outlet vents.

Although these vehicle HVAC systems have worked for their intended purposes, some disadvantages remain. For instance, the air distribution system within these HVAC systems is designed to provide a defrost mode where air is directed to the front windshield through a defrost outlet, a face mode where air is directed through vents in the instrument panel toward the upper portion of the body of the passengers and a floor mode where air is directed toward floor outlets that direct air towards the feet of the passengers. Typically, the defrost mode is used to defog the windshield, the face mode is used during cooling of the passenger compartment and the floor mode is used during heating of the passenger compartment.

Some HVAC systems allow for a combination of modes to be set by the passenger. These combination modes can be defrost/foot mode, face/foot mode or what is termed bi-level or any other combination of two or more modes. Other than these bi-level modes, the typical HVAC system directs all air to the vents in the instrument panel when the face mode is selected and all air to the floor vents when the floor mode is selected.

In some designs, it may be advantageous to always supply some of the conditioned air to the floor vents. Always supplying some air flow to the floor vents will ensure the circulation of air to the passenger's feet. For example, when the HVAC system is set to face mode during the cooling of the passenger compartment, it may be advantageous to supply a small amount of cool air flow to the floor vents to increase the comfort level for the passengers in the vehicle.

SUMMARY

This section provides a general summary of the disclosure, and is not a comprehensive disclosure of its full scope or all of its features.

The present disclosure provides the art with a HVAC system that provides a small amount of air flow to the floor vents when the HVAC system is set to the face mode. In the present disclosure a door is provided which switches between the face mode and the floor mode. In the face mode, the door prohibits air flow to the floor vents and in the floor mode, the door prohibits air flow to the vents in the instrument panel. The air conditioning case is provided with a floor vent bleed passage which allows a specific amount of conditioned air to bypass the door which is prohibiting air flow to the floor vents. In this manner, the specific amount of air flow is provided to the floor vents when the HVAC system is in the face mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
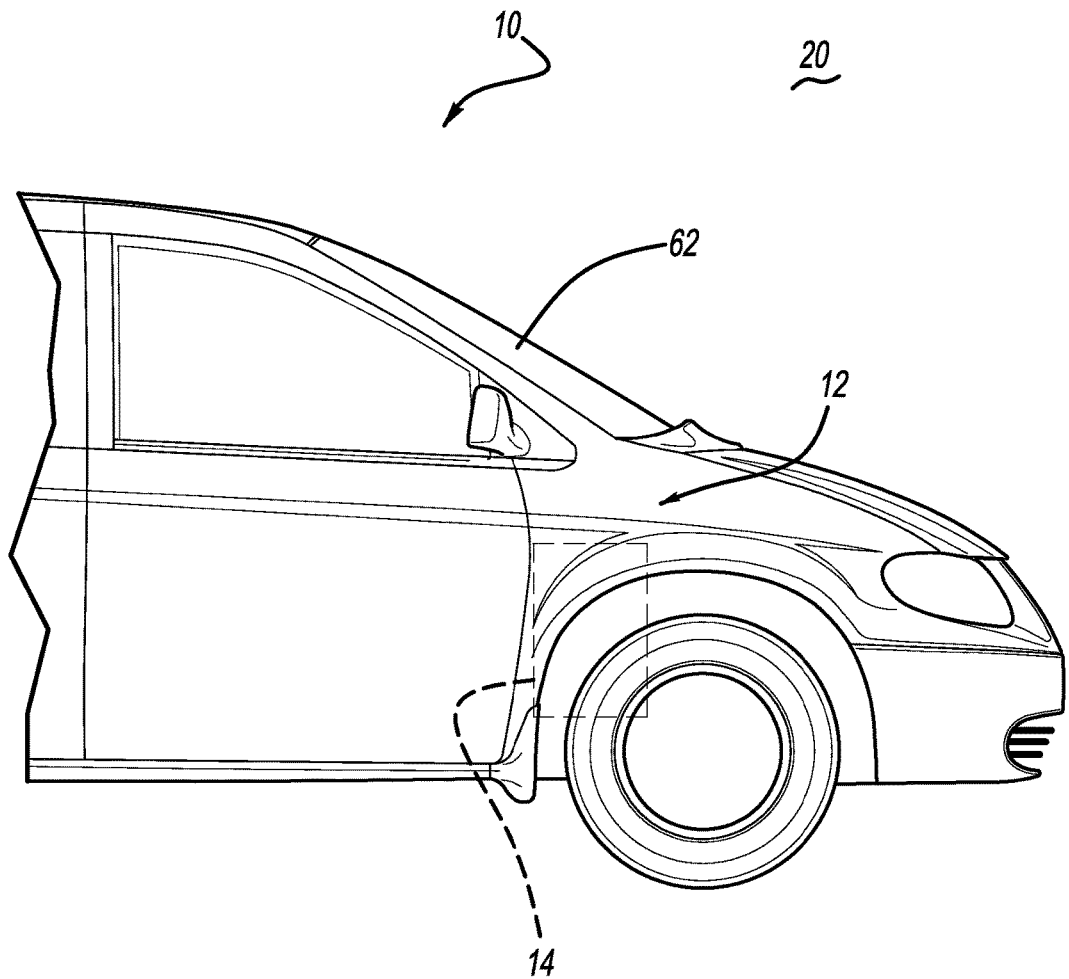
FIG. 1 is a side view of a vehicle with a HVAC system in accordance with the present disclosure schematically illustrated therein.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
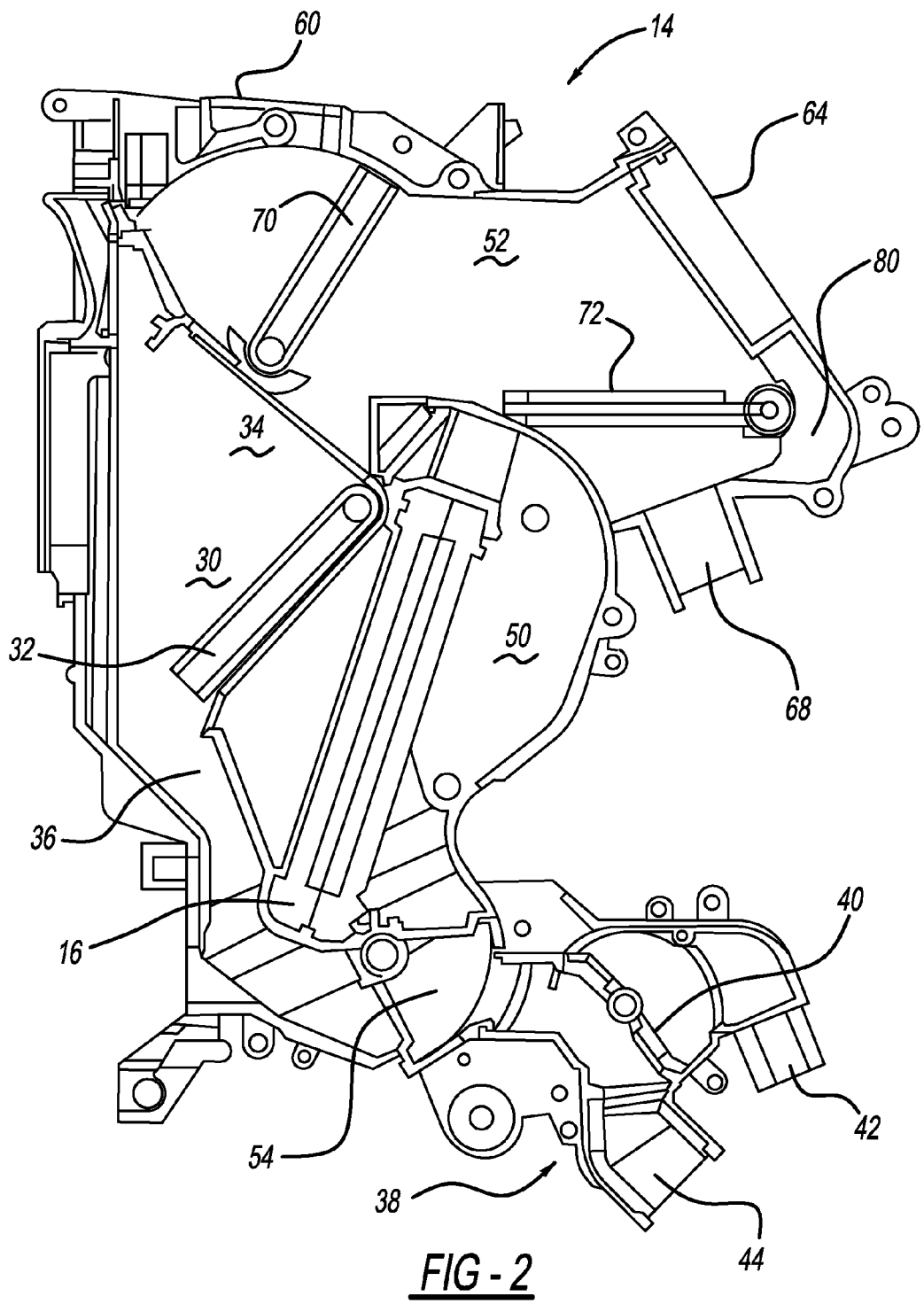
FIG. 2 is a sectional view of an air conditioning case of the HVAC system illustrated in FIG. 1.
Figure 3:
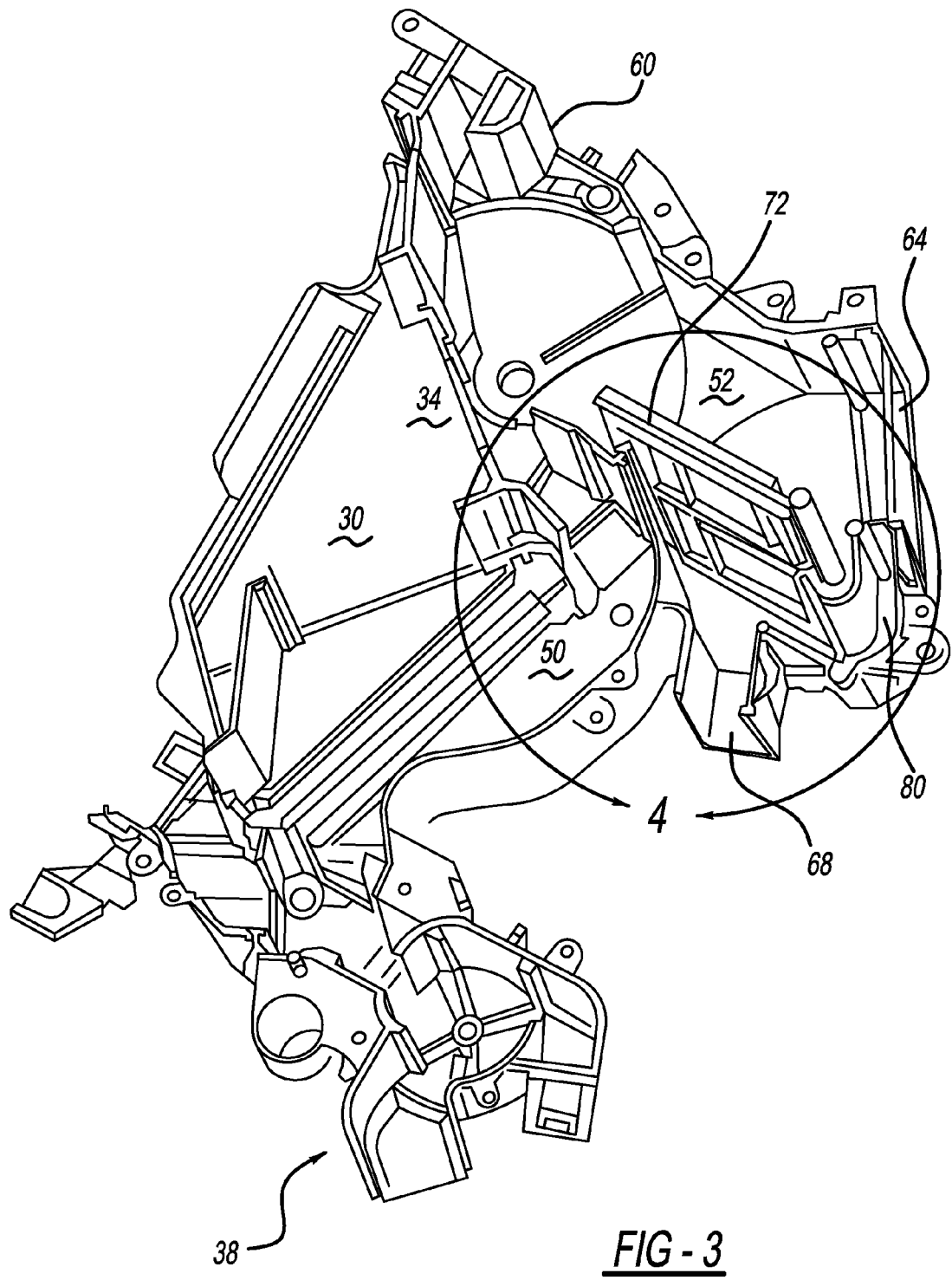
FIG. 3 is a perspective view of the air conditioning case illustrated in FIG. 2.
Figure 4:
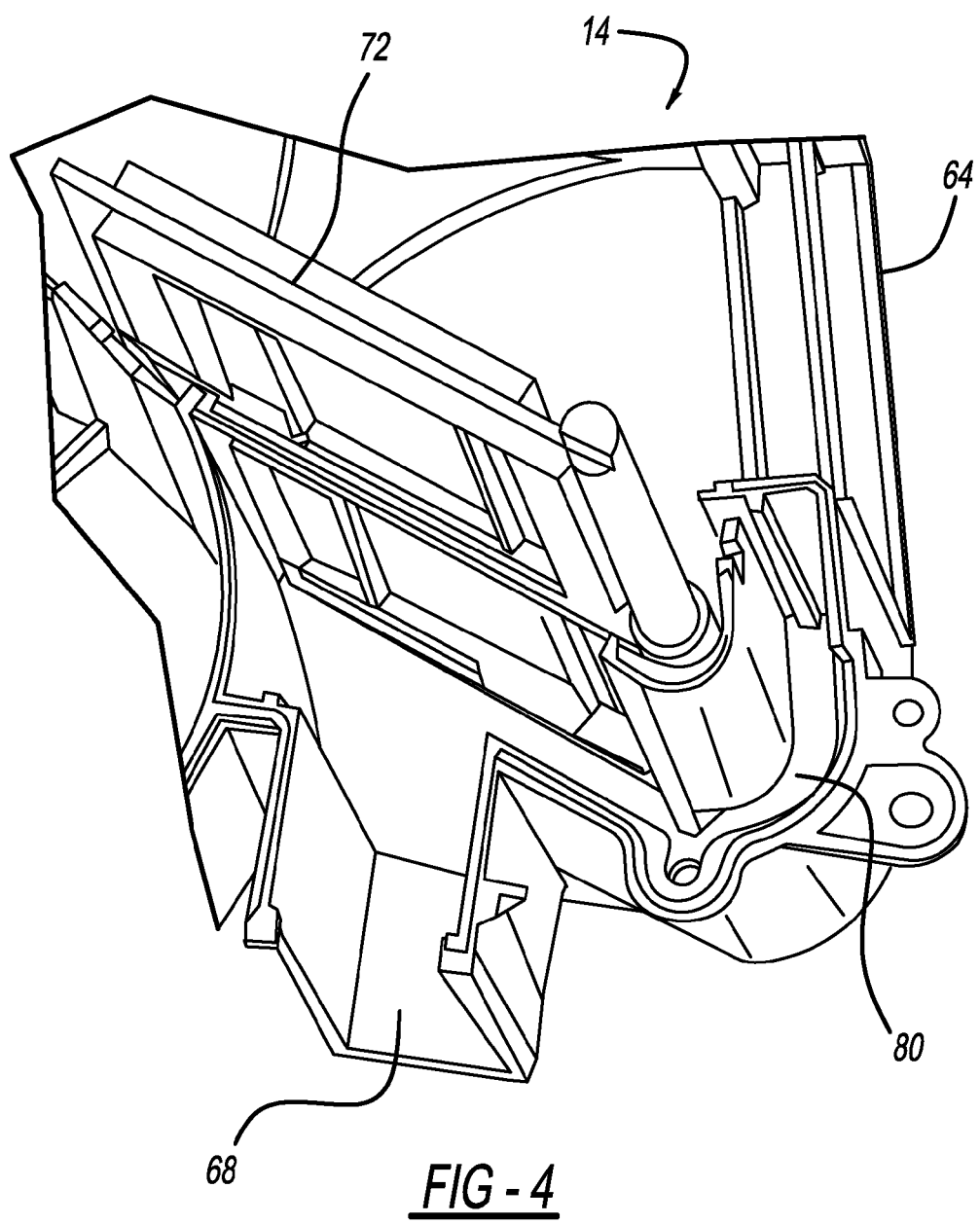
FIG. 4 is an enlarged perspective view of the by-pass passage in the air conditioning case illustrated in FIGS. 2 and 3.

With reference to FIG. 1-4, a vehicle 10 incorporating a HVAC system 12 in accordance with the present disclosure is illustrated. The HVAC system 12 is typically disposed with the dashboard of vehicle 10 and either cools or warms air flowing through the HVAC system 12. In order to cool the air, the HVAC system 12 houses an evaporator (not shown) in an air conditioning case 14 which is part of an air conditioning system of the vehicle. In order to heat the air, the HVAC system 12 houses a heating heat exchanger 16 in the air conditioning case 14 which typically receives engine coolant from an engine cooling system (not shown) of vehicle 10.

HVAC system 12 comprises air conditioning case 14 having a conventional fan (not shown) which is arranged on an upstream side of the evaporator (not shown). Low pressure refrigerant flowing into the evaporator absorbs heat from the air in the air conditioning case 14 for evaporation. An inside/outside air switch box (not shown) is typically disposed on the suction side of the conventional fan. The air inside the passenger compartment (inside air) and/or the air outside the passenger compartment (outside air) is introduced through the inside/outside air switch box into the air conditioning case 14 by the conventional fan.

The air conditioning case 14 accommodates, on the downstream side of the evaporator, the heating heat exchanger 16. Hot water (coolant) of the vehicle engine (not shown) is directed to the heating heat exchanger 16 by a water pump (not shown). A water valve (not shown) may be incorporated to control the flow volume of the engine coolant supplied to the heating heat exchanger 16.

The air conditioning case 14 comprises a cool air area 30 immediately downstream of the evaporator and immediately upstream of the heating heat exchanger 16. An air mix door 32 controls the amount of cool air from the cool air area 30 that is directed through the heating heat exchanger 16 and the amount of air that is directed through a cool air bypass passage 34 that bypasses the heating heat exchanger 16. While the air mix door 32 is illustrated as a pivoting door, it is within the scope of the present disclosure to use any type of door known in the art. A second cool air bypass passage 36 is disposed on the side of the heating heat exchanger 16 from the cool air bypass passage 34. The cool air bypass passage 36 directs cool air to a rear passenger air distribution system 38 that directs air to the rear seating area of vehicle 10. The air distribution system 38 comprises a door 40 that switches the air flow to the rear seating area between a rear face duct 44 and a rear foot duct 42.

The air mix door 32 can be positioned to direct air flow to the cool air bypass passage 34 and prohibit air flow going to the heating heat exchanger 16, to direct air flow through the heating heat exchanger 16 and prohibit air flow going to the cool air bypass passage 34 or to allow air flow to both the cool air bypass passage 34 and through the heating heat exchanger 16 depending on the temperature requirement set for the HVAC system 12. Air directed through the heating heat exchanger 16 flows to a warm air area 50. The warm air area 50 is in communication with the air distribution system 38 and a warm/cold mixing area 52. A door 54 controls the amount of air from the warm air area 50 and the cool air bypass passage 36 going to the rear seating area of vehicle 10.

The warm/cold mixing area 52 receives warm air from the warm air area 50 and cool air from the cool air bypass passage 34. The warm and cool air are mixed together to provide the conditioned air at the temperature set for the HVAC system 12. The conditioned air is supplied from the warm/cold mixing area 52 to one or more of outlets defined by air conditioning case 14. Air conditioning case 14 defines a defroster outlet 60 which directs air to a windshield 62 of vehicle 10, a face outlet 64 that directs air to a plurality of vents in the instrument panel that directs the air to the upper portion of the passenger compartment of the vehicle 10, and a foot outlet 68 that directs air to one or more foot vents that direct air to the lower portion of the passenger compartment.

A defrost door 70 directs air flow to the defroster outlet 60 and/or to the face outlet 64 and the foot outlet 68. While defrost door 70 is illustrated as a circular pivoting door, it is within the scope of the present disclosure to use any type of door known in the art. The defrost door 70 can be set to direct all air to the defroster outlet 60, to direct all air to the face outlet 64 and the foot outlet 68 or to direct air to both the defroster outlet 60 and the face outlet 64 and the foot outlet 68.

A face/foot door 72 directs air flow to the face outlet 64 and/or the foot outlet 68. While face/foot door 72 is illustrated as a flat pivoting door, it is within the scope of the present disclosure to use any type of door known in the art. The face/foot door 72 can be set to prohibit air flow to the face outlet 64, to prohibit air flow to the foot outlet 68, or to allow air flow to both the face outlet 64 and the foot outlet 68.

The air conditioning case 14 defines an open air bypass passage 80 that allows a specified amount of air flow to bypass the face/foot door 72 and provide air flow to the foot outlet 68 when the face/foot door 72 is positioned to prohibit air flow to the foot outlet 68. Thus, when the face/foot door 72 prohibits air flow to the foot outlet 68, a specified amount of air is allowed to bypass the face/foot door 72 through the air bypass passage 80 and provide this specified amount of air flow to foot outlet 68.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation and air conditioning system comprising:
    a case defining a front face outlet and a front foot outlet;
    a first door movable between a first position closing the front face outlet and opening the front foot outlet and a second position opening the front face outlet and closing the front foot outlet; and
    a bypass passage configured to direct air flow around the first door to the front foot outlet without directing air flow through a rear passenger air distribution system of the case when the first door is in the second position.

2. The heating, ventilation and air conditioning system according to claim 1, wherein the case defines a defroster outlet and the heating, ventilation and air conditioning system further comprises a second door movable between a first position closing the defroster outlet and a second position opening the defroster outlet.

3. The heating, ventilation and air conditioning system according to claim 2, wherein air flow to the front face outlet and the front foot outlet is prohibited by the second door when the second door is in the second position.

4. The heating, ventilation and air conditioning system according to claim 3, wherein the second door is upstream from the first door in a direction of air flow through the case.

5. The heating, ventilation and air conditioning system according to claim 3, further comprising:
    a heating heat exchanger disposed in the case; wherein the case defines a cold air passage; and
    the heating, ventilation and air conditioning system further defines a third door, the third door controlling air flow through the heating heat exchanger and air flow through the cold air passage.

6. The heating, ventilation and air conditioning system according to claim 1, further comprising:
    a heating heat exchanger disposed in the case; wherein the case defines a cold air passage; and
    the heating, ventilation and air conditioning system further defines a second door, the second door controlling air flow through the heating heat exchanger and air flow through the cold air passage.

7. The heating, ventilation and air conditioning system according to claim 1, wherein the first door is pivotally attached to the case at one end of the first door.

8. The heating, ventilation and air conditioning system according to claim 7, wherein the bypass passage allows the air flow to the front foot outlet by allowing air flow around the one end of the first door.

9. The heating, ventilation and air conditioning system according to claim 1, wherein:
    the case further defining a cool air area, a warm air area, a rear face outlet and a rear foot outlet; and
    air flow between the cool air area and the front face outlet is totally separate from the air flow between the cool air area and the rear face outlet.

10. The heating, ventilation and air conditioning system according to claim 9, wherein air flow between the warm air area to the front foot outlet is totally separate from air flow between the front air area and the rear foot outlet.

11. The heating, ventilation and air conditioning system according to claim 1, wherein air flow between the warm air area to the front foot outlet is totally separate from air flow between the front air area and the rear foot outlet.

* * * * *